United States Patent
Lim et al.

(10) Patent No.: US 12,241,514 B2
(45) Date of Patent: Mar. 4, 2025

(54) ACTUATOR FOR BRAKE DEVICE AND BRAKE DEVICE INCLUDING SAME

(71) Applicant: HL MANDO CORPORATION, Pyeongtaek-si (KR)

(72) Inventors: Woochul Lim, Yongin-si (KR); Soosung Kim, Seoul (KR); Daejune Jung, Seoul (KR); Joon-kyu Song, Seongnam-si (KR)

(73) Assignee: HL MANDO CORPORATION, Pyeongtaek si (KR)

( * ) Notice: Subject to any disclaimer, the term of this patent is extended or adjusted under 35 U.S.C. 154(b) by 412 days.

(21) Appl. No.: 17/793,258

(22) PCT Filed: Jan. 19, 2021

(86) PCT No.: PCT/KR2021/000757
§ 371 (c)(1),
(2) Date: Jul. 15, 2022

(87) PCT Pub. No.: WO2021/153939
PCT Pub. Date: Aug. 5, 2021

(65) Prior Publication Data
US 2023/0068562 A1    Mar. 2, 2023

(30) Foreign Application Priority Data
Jan. 30, 2020 (KR) .................. 10-2020-0010975

(51) Int. Cl.
*F16D 65/18* (2006.01)
*B60T 13/74* (2006.01)
(Continued)

(52) U.S. Cl.
CPC ............ *F16D 65/18* (2013.01); *B60T 13/741* (2013.01); *F16D 2121/24* (2013.01); *F16D 2125/50* (2013.01); *F16D 2125/52* (2013.01)

(58) Field of Classification Search
CPC ............... F16D 65/18; F16D 2121/24; F16D 2125/50; F16D 2125/52; B60T 13/74; B60T 13/711; B60T 13/746
(Continued)

(56) References Cited

U.S. PATENT DOCUMENTS 5,024,299 A * 6/1991 Shaw .................... F16D 65/563
188/162
9,340,194 B2 * 5/2016 Giering .................. F16D 65/18
(Continued)

FOREIGN PATENT DOCUMENTS

DE    102011085367 A1 *  5/2012 ............. F16D 65/18
DE    102012208294 A1 * 11/2012 ............ B60T 13/741
(Continued)

OTHER PUBLICATIONS

International Search Report issued in corresponding International Patent Application No. PCT/KR2021/000757, dated May 3, 2021.

*Primary Examiner* — Thomas J Williams
(74) *Attorney, Agent, or Firm* — LEE, HONG, DEGERMAN, KANG & WAIMEY (57) ABSTRACT

Disclosed is an actuator for a brake device. An actuator for a brake device according to embodiment of the disclosure includes a housing accommodating a motor, a power transmission unit connected to the motor, and a reduction gear unit connected to the power transmission unit; and a cover covering an open top of the housing and having a shaft support portion; wherein the reduction gear unit includes a worm wheel including a concave receiving groove on an upper surface thereof and a locking rib provided in the receiving groove, a sun gear supported rotatably on a bottom of the receiving groove and having a support rib contactable with the locking rib during rotation, and a clutch spring provided in a state of being slidably wound around an outer circumferential surface of the shaft support portion, and configured to tighten or loosen selectively an outer circumferential surface of the shaft support portion according to a rotation direction when the worm wheel and the sun gear are rotated relative to each other.

15 Claims, 10 Drawing Sheets

(51) Int. Cl.
  *F16D 121/24*    (2012.01)
  *F16D 125/50*    (2012.01)
  *F16D 125/52*    (2012.01)

(58) Field of Classification Search
  USPC .................................... 188/72.1, 72.7, 72.8
  See application file for complete search history.

(56) References Cited

U.S. PATENT DOCUMENTS

| | | | |
|---|---|---|---|
| 9,528,563 B2* | 12/2016 | Balz | F16D 65/18 |
| 10,316,914 B2* | 6/2019 | Loens | B60T 13/588 |
| 2015/0175143 A1* | 6/2015 | Sun | F16D 65/183 |
| | | | 74/89.16 |
| 2016/0377137 A1* | 12/2016 | Ohlig | B60T 13/746 |
| | | | 188/106 F |
| 2018/0238408 A1* | 8/2018 | Song | F16D 65/18 |
| 2019/0360542 A1* | 11/2019 | Song | F16D 65/18 |
| 2020/0240484 A1* | 7/2020 | Hur | F16D 13/10 |
| 2023/0068562 A1* | 3/2023 | Lim | B60T 13/741 |

FOREIGN PATENT DOCUMENTS

| | | | | |
|---|---|---|---|---|
| DE | 102013209401 A1 * | 11/2014 | ........... | B60T 13/741 |
| JP | WO2019/198509 A1 | 1/2021 | | |
| KR | 10-0586154 B1 | 6/2006 | | |
| KR | 10-2014-0030209 A | 3/2014 | | |
| KR | 10-2016-0133098 A | 11/2016 | | |
| KR | 10-2017-0084686 A | 7/2017 | | |

* cited by examiner

ACTUATOR FOR BRAKE DEVICE AND BRAKE DEVICE INCLUDING SAME

CROSS-REFERENCE OF RELATED APPLICATIONS

This application is the U.S. National Phase under 35 U.S.C. § 371 of International Patent Application No. PCT/KR2021/000757, filed on Jan. 19, 2021, which in turn claims the benefit of Korean Application No. 10-2020-0010975, filed on Jan. 30, 2020, the entire disclosures of which applications are incorporated by reference herein.

TECHNICAL FIELD

The present disclosure relates to an actuator and a brake device having the same, and more particularly, to an actuator capable of realizing a parking function by operation of a motor and a brake device having the same.

BACKGROUND ART

Generally, a brake device is a device for stopping a vehicle from moving during braking or parking, and serves to prevent a wheel of the vehicle from rotating.

Recently, an Electric Parking Brake (EPB) system for electronically controlling driving of a parking brake has been widely used, and the EPB is mounted on a conventional disc brake to perform function of the parking brake. The electric parking brakes include a cable puller type, a motor-on-caliper (MOC) type, and a hydraulic parking brake type.

For example, documents disclosed in Korean Patent Publication No. 10-2011-0072877 (Jun. 29, 2011) relates to a structure of a MOC-type EPB actuator, a motor for generating power is connected to the EPB actuator. Furthermore, this EPB actuator discloses an actuator used in an electronic disc brake that decelerates the power generated from the motor while increasing torque by using a plurality of gear devices and transmits the power to a caliper, thereby performing a braking operation.

DISCLOSURE

Technical Problem

An aspect of the disclosure is to provide an actuator for a brake device capable of preventing reverse rotation torque during braking through a simple structure, and a brake device having the same.

Technical Solution

In accordance with an aspect of the disclosure, an actuator for a brake device includes a housing accommodating a motor, a power transmission unit connected to the motor, and a reduction gear unit connected to the power transmission unit; and a cover covering an open top of the housing and having a shaft support portion; wherein the reduction gear unit includes a worm wheel rotating by receiving power from the power transmission unit, the worm wheel including a concave receiving groove on an upper surface thereof and a locking rib provided in the receiving groove, a sun gear supported rotatably on a bottom of the receiving groove and having a support rib contactable with the locking rib during rotation, and a clutch spring provided in a state of being slidably wound around an outer circumferential surface of the shaft support portion and configured to tighten or loosen selectively an outer circumferential surface of the shaft support portion by coming into contact with at least one of the support rib and the locking rib according to a rotation direction when the worm wheel and the sun gear are rotated relative to each other.

The clutch spring may include a body surrounding the outer circumferential surface of the shaft support portion a plurality of times, a first end protruding from a lower end of the body to be positioned between the support rib and the locking rib and capable of contacting the support rib and the locking rib during rotation, and a second end protruding from an upper end of the body and capable of contacting the locking rib during rotation.

The first end may be, when the worm wheel rotates counterclockwise, configured to rotate counterclockwise while in contact with the support rib and the locking rib so that the body is slidable with respect to the outer surface of the shaft support portion.

The second end may be, when the worm wheel rotates clockwise, configured to rotate clockwise while in contact with the locking rib so that the body is slidable with respect to the outer surface of the shaft support portion.

The first end may be, when the sun gear rotates clockwise, configured to rotate clockwise by the support rib so that the body tightens the outer surface of the shaft support portion.

A plurality of the support ribs and the locking ribs may be alternately positioned along a circumferential direction in the receiving groove to be in contact with each other during rotation.

The locking rib may include a first portion extending from a side wall of the receiving groove toward a center of the receiving groove and contacting at least one of the support rib and the first end during rotating, and a second portion extending in a longitudinal direction from the first portion and contacting the second end during rotation.

The reduction gear unit may include a plurality of planetary gears meshed with the sun gear, a ring gear as an internal gear to accommodate the plurality of planetary gears, and a carrier rotatably supporting the plurality of planetary gears and having a rotation shaft supported by the shaft support portion so as to rotate coaxially with the sun gear.

The worm wheel may include a circular body in which the receiving groove is formed, and a ring body coupled to an outer circumferential of the circular body and having a gear portion.

The circular body may include a steel material, and the ring body includes a plastic material.

The circular body and the ring body may be manufactured by an insert injection.

The power transmission unit may include a worm member, the worm member including a shaft portion having helical gear teeth and a driven worm wheel provided at an end of the shaft portion so as to mesh with the driving worm coupled to a rotation shaft of the motor.

In accordance with another aspect of the present disclosure, a brake device includes a piston slidably provided in a cylinder of a caliper housing to press a pad plate; an actuator including a housing accommodating a motor, a power transmission unit connected to the motor, and a reduction gear unit connected to the power transmission unit, and a cover covering an open top of the housing and having a shaft support portion; and an output conversion device that receives a rotational motion from the actuator and converts the rotational motion into a linear motion to apply a thrust to move the piston; wherein the reduction gear unit includes a worm wheel rotating by receiving power from the power transmission unit, the worm wheel including a concave receiving groove on an upper surface thereof and a locking rib provided in the receiving groove, a sun gear supported rotatably on a bottom of the receiving groove and having a support rib contactable with the locking rib during rotation, and a clutch spring provided in a state of being slidably wound around an outer circumferential surface of the shaft support portion and configured to tighten or loosen selectively an outer circumferential surface of the shaft support portion by coming into contact with at least one of the support rib and the locking rib according to a rotation direction when the worm wheel and the sun gear are rotated relative to each other.

The clutch spring may include a body surrounding the outer circumferential surface of the shaft support portion a plurality of times, a first end protruding from a lower end of the body to be positioned between the support rib and the locking rib and capable of contacting the support rib and the locking rib during rotation, and a second end protruding from an upper end of the body and capable of contacting the locking rib during rotation.

When the sun gear rotates by reaction force of the output conversion device after braking, the body may tighten the outer circumferential surface of the shaft support portion as the support rib presses and rotates the first end.

Advantageous Effects

An embodiment of disclosure may improve productivity through cost reduction by simplifying the configuration of the locking structure for preventing the reverse rotation torque generated during braking.

MODES OF THE INVENTION

Hereinafter, the embodiments of the disclosure will be described in detail with reference to accompanying drawings. It should be understood that the terms used in the specification and the appended claims should not be construed as limited to general and dictionary meanings, but interpreted based on the meanings and concepts corresponding to technical aspects of the disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
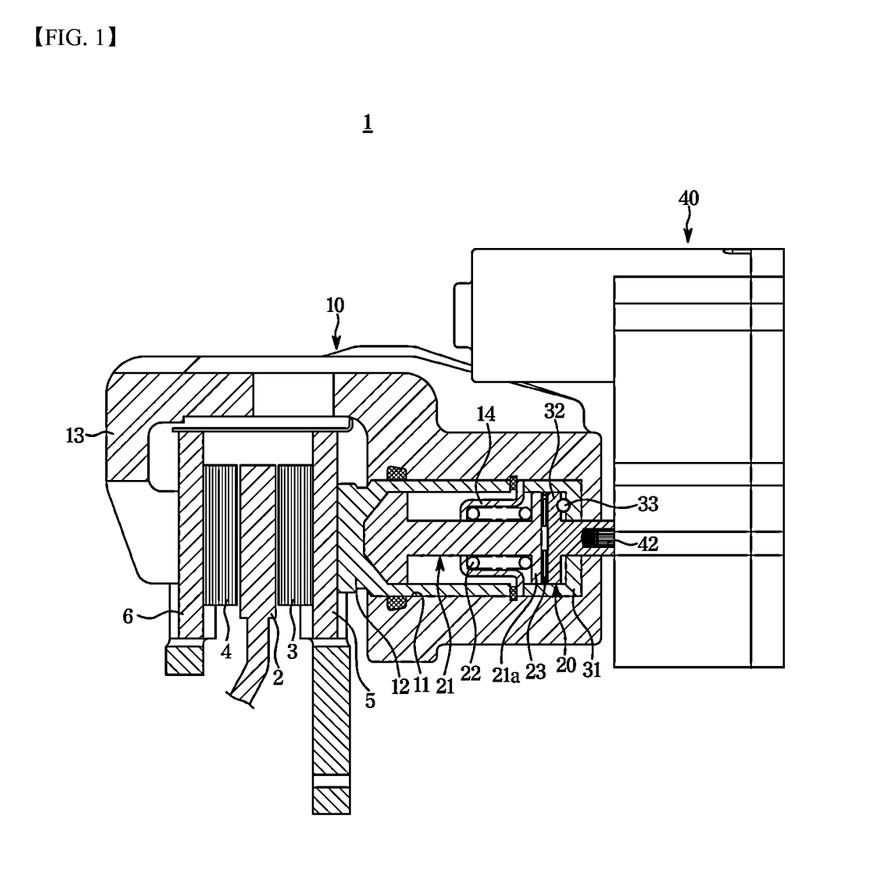
FIG. 1 is a schematic view illustrating a brake device according to an embodiment of the disclosure.
Figure 2:
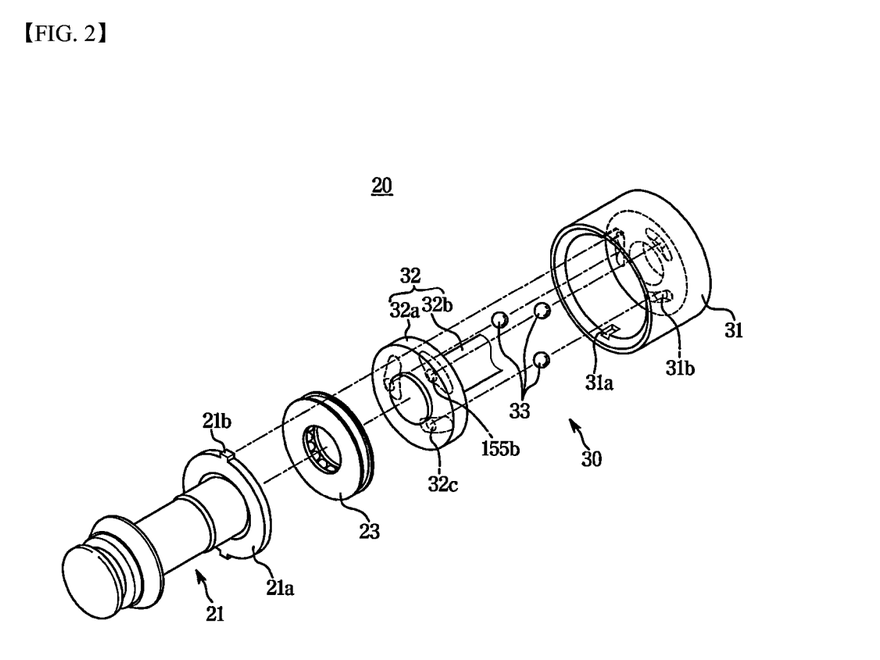
FIG. 2 is a perspective view illustrating a ball-in lamp mechanism according to an embodiment of the disclosure.

Referring to FIGS. 1 and 2, a brake device 1 according to an embodiment of the disclosure may include a disk 2 rotating together with a wheel, a carrier in which a pair of pad plates 5 and 6 to which friction pads 3 and 4 are attached, respectively, are installed to be spaced apart from each other, a caliper housing 10 that is slidably installed on the carrier and operates the pair of pad plates 5 and 6, a piston 12 installed so as to move forward and backward in a cylinder 11 of the caliper housing 10, and an output conversion device 20 that receives rotational force from an actuator 40 including a motor 41 and a reduction gear unit 100 and converts rotational force into linear motion to give a thrust to move the piston 12.

The caliper housing 10 includes the cylinder 11 in which the piston 12 is embedded, and a finger part 13 for operating the pair of pad plates 5 and 6.

The pad plates 5 and 6 have the friction pads 3 and 4 attached to thereinside, one pad plate 5 is disposed so as to be in contact with the piston 12, and the other pad plate 6 is disposed so as to be in contact with the finger part 13.

The output conversion device 20 receives power from the actuator 40, converts a rotational motion into a translational motion, and presses the piston 12 toward the pad plate 5.

As an example, the output conversion device 20 may be configured to a ball-in-ramp (BIR) mechanism 30 and a push member 21 for pressing the piston 12 by operation of the BIR mechanism 30.

The BIR mechanism 30 includes a fixed ramp 31 fixedly installed in the cylinder 11, and a rotating ramp 32 positioned in front of the fixed ramp 31 so as to rotate by receiving power from the actuator 40, a ball 33 interposed between the fixed ramp 31 and the rotating ramp 32.

The rotating ramp 32 includes a disc portion 32a in the form of a disc, and a shaft portion 32b extending from a center of the disc portion 32a toward the fixed ramp 31, and has a T-shaped cross section in an axial direction.

The shaft portion 32b of the rotating lamp 32 is a part rotated by receiving power from the actuator 40, and a rear end of the shaft portion 32b penetrates the fixed lamp 31 and the cylinder 11 and is connected to an output shaft 42 of the actuator 40.

The fixed lamp 31 has a cylindrical shape with an open front, and is fixedly installed in the cylinder 11. Furthermore, a flange 21a of the push member 21 and a thrust bearing 23 are disposed in the fixing ramp 31.

The flange 21a of the push member 21 is slidably coupled to the fixed ramp 31 in a state in which rotation thereof is limited by being inserted a projection 21b protruding from an outer circumferential of the flange into a fitting groove 31a formed on an inner circumferential of the fixing ramp 31. The thrust bearing 23 is interposed between the flange 21a of the push member 21 and the disk portion 32a of the rotation ramp 32.

The ball 33 is interposed between the fixed ramp 31 and the rotating ramp 32. The ball 33 are settled on the facing surfaces of the fixed ramp 31 and the rotating ramp 32, respectively, thereby forming movable guide grooves 31*b* and 32*c*.

The guide grooves 31*b* and 32*c* are formed to extend in an arc shape with a predetermined inclination angle along a circumferential direction thereof, respectively. Accordingly, as the rotating lamp 32 rotates, the ball 33 roll between the inclined guide grooves 31*b* and 32*c*, and in turn as the ball 33 roll, the rotating lamp 32 rotates and moves forward along the axial direction toward the piston 12.

The push member 21 is elastically supported in a direction in which the rotating ramp 32 is pressed toward the fixed ramp 31 by the elastic member 22 provided in the cylinder 11.

The elastic member 22 has one end elastically supported by a retainer 14 fixed to an inner wall of the cylinder 11, and the other end including a coil spring elastically supported by the flange 21*a* of the push member 21.

The elastic member 22 provides elastic force in a direction in which the flange 21*a* of the push member 21 presses the thrust bearing 23 so that the fixed ramp 31 and the rotating ramp 32 are in close contact with each other, and in a state in which a rotation torque applied to the rotation lamp 32 is removed returns the push member 21 by rotating the rotation lamp 32 to its original position.

On the other hand, in an embodiment of the disclosure, as an example of the output conversion device 20, the structure of the BIR mechanism formed by the balls 33 interposed between the fixed ramp 31 and the rotating ramp 32 is described, but if it is a configuration that converts a rotational motion of the actuator 40 into a linear motion, various known configurations may be employed.

Figure 3:
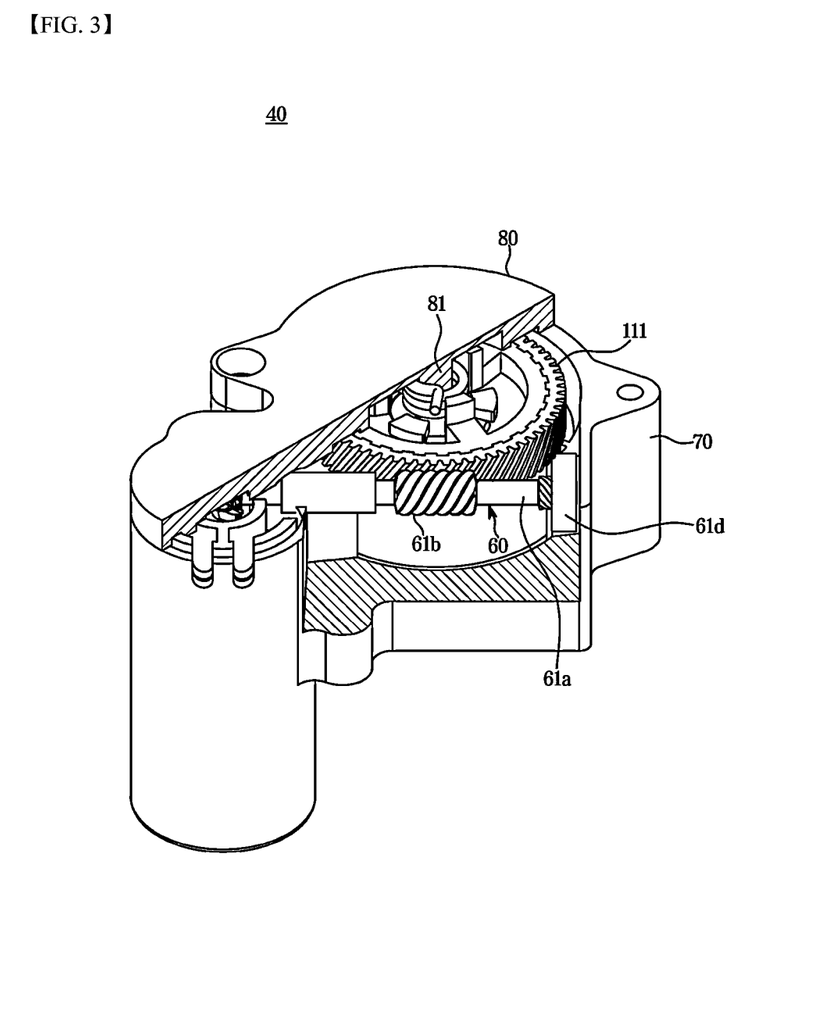
FIG. 3 is a cutaway perspective view illustrating an actuator according to an embodiment of the disclosure.
Figure 4:
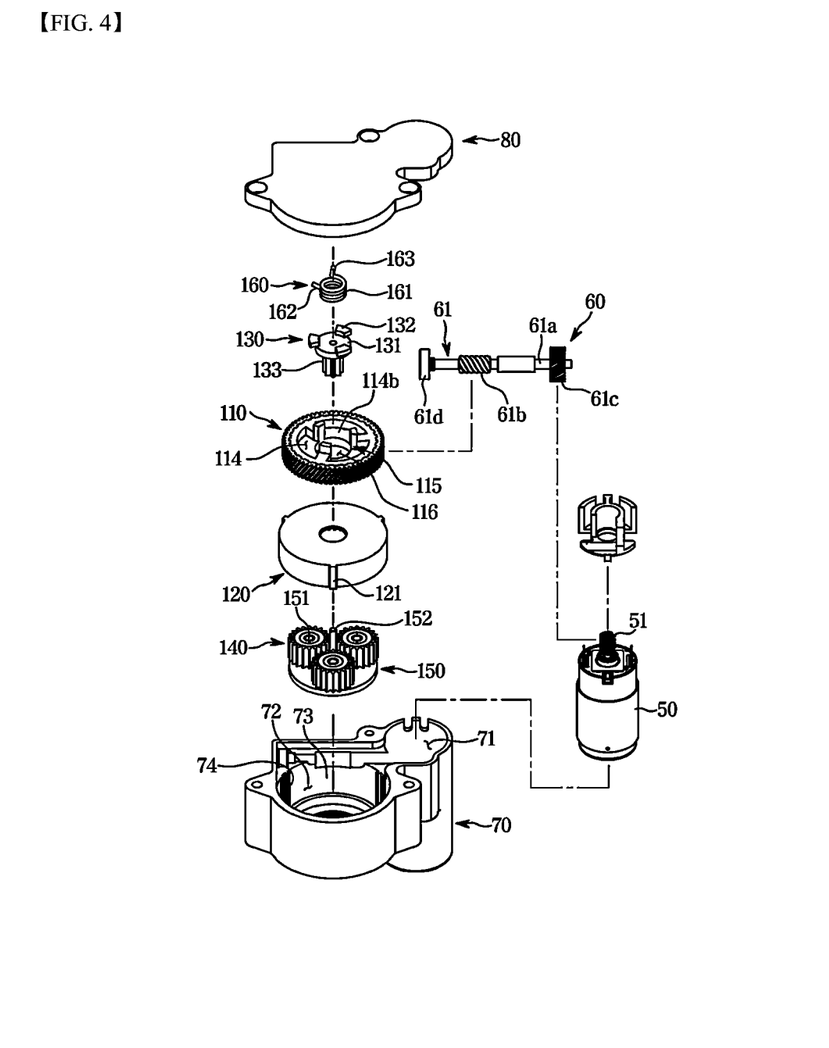
FIG. 4 is an exploded perspective view illustrating an actuator according to an embodiment of the disclosure.
Figure 5:
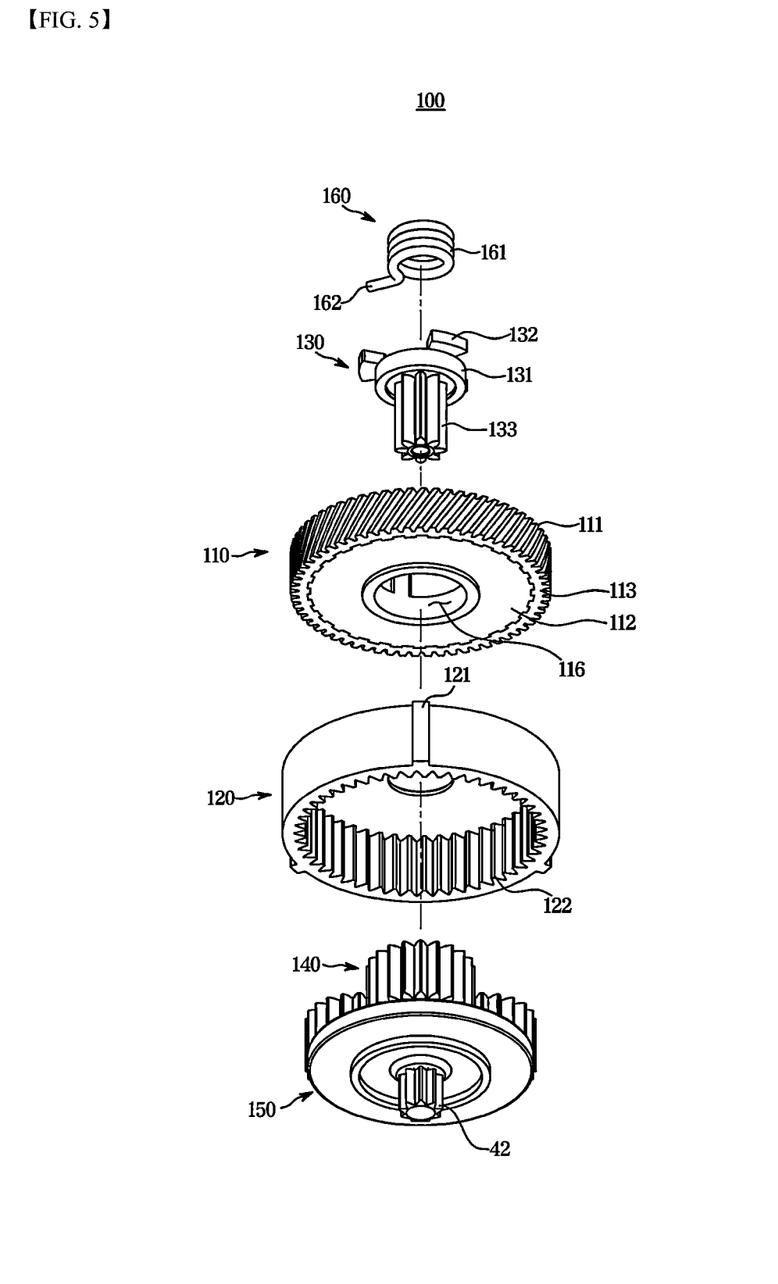
FIG. 5 is an exploded perspective view illustrating a reduction gear unit according to an embodiment of the disclosure.
Figure 6:
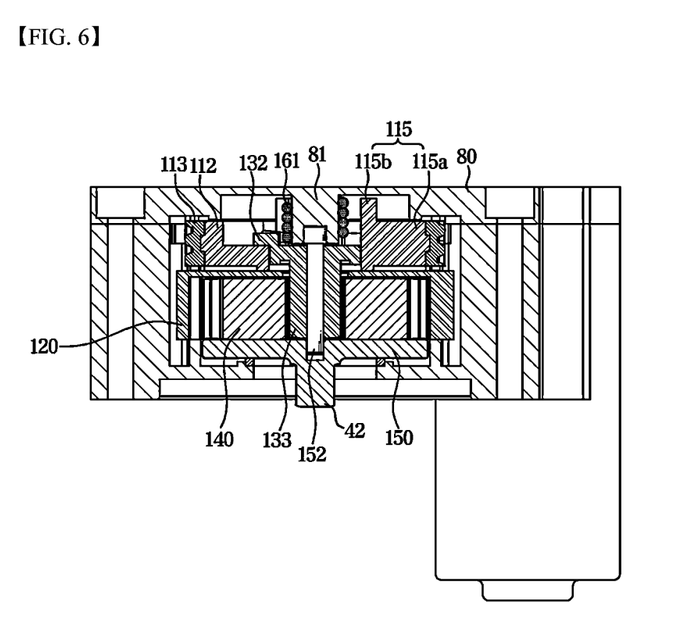
FIG. 6 is a cross-sectional view of the reduction gear unit according to an embodiment of the disclosure.
Figure 7:
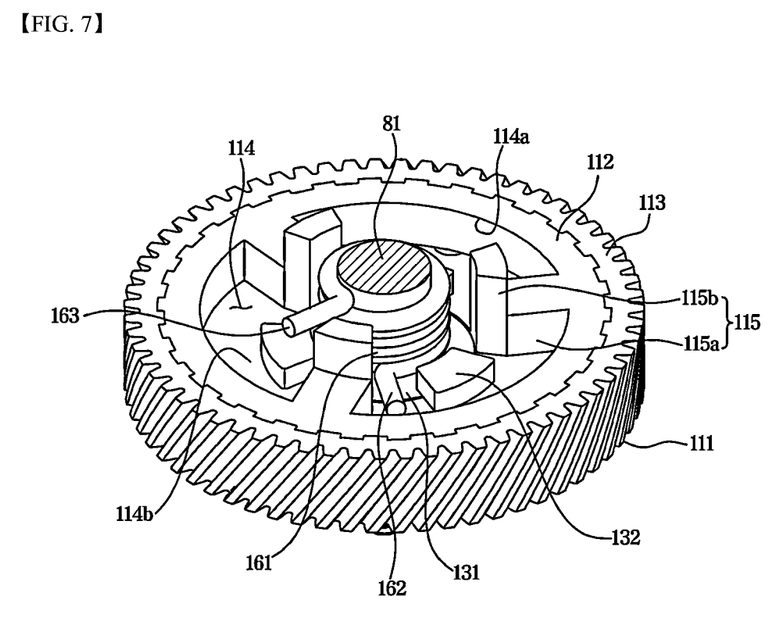
FIG. 7 is a perspective view illustrating a worm wheel according to an embodiment of the disclosure.

FIG. 3 is a cutaway perspective view illustrating an actuator according to an embodiment of the disclosure, FIG. 4 is an exploded perspective view illustrating an actuator according to an embodiment of the disclosure, FIG. 5 is an exploded perspective view illustrating a reduction gear unit according to an embodiment of the disclosure, FIG. 6 is a cross-sectional view illustrating the reduction gear unit according to an embodiment of the disclosure, and FIG. 7 is a perspective view illustrating a worm wheel according to an embodiment of the disclosure.

Referring to FIGS. 3 to 7, the actuator 40 according to an embodiment of the disclosure include a motor 50, a power transmission unit 60 connected to the motor 50, a reduction gear unit 100 connected to the power transmission unit 60, and a housing 70 and a cover 80 coupled to each other in order to accommodate them.

The housing 70 has an open top, and the cover 80 is coupled to the housing 70 so as to cover the open top of the housing 70.

The housing 70 has one side forming a motor accommodating portion 71 in which the motor 50 is accommodated, and the other side having a gear accommodating portion 72 in which the reduction gear unit 100 is accommodated.

The motor accommodating portion 71 has a depth that may accommodate the motor 50, and may be formed as a cylindrical groove with an open top, and the gear accommodating portion 72 is positioned adjacent to the motor accommodating portion 71 and may be formed as a cylindrical groove capable of accommodating the reduction gear unit 100.

The cover 80 is installed to cover the open top of the housing 70, and on a surface facing the gear accommodating portion 72 is provided a cylindrical shaft support portion 81 extending downward.

The shaft support portion 81 is a part on which a rotation shaft 152 of the carrier 150, which is a component of the reduction gear unit 100, is rotatably supported.

The motor 50 may be configured to rotate in both directions, and power transmission from the motor 50 to the reduction gear unit 100 may be made through the power transmission unit 60.

The power transmission unit 60 includes a worm member 61 that receives power from the motor 50 and transmits the power to the reduction gear unit 100.

The worm member 61 includes a shaft portion 61*a*, helical gear teeth 61*b* provided on the shaft portion 61*a*, and a driven worm wheel 61*c* and bearings 61*d* that are installed at opposite ends of the shaft portion 61*a*.

A driving worm 51 is coupled to the rotation shaft of the motor 50, and the driving worm 51 is engaged with the driven worm wheel 61*c* of the worm member 61 to transmit rotational force of the motor 50 to the worm member 61.

Then, the rotation of the worm member 61 is transmitted to the reduction gear unit 100 and then is output by increasing through the output shaft 42 of the reduction gear unit 100.

The reduction gear unit 100 includes a worm wheel 110 meshed with the worm member 61, a ring gear 120 disposed under the worm wheel 110 and formed as an internal gear, a sun gear 130 having an upper end supported to rotate with respect to the worm wheel 110 and a lower end thereof extending into the inside of the ring gear 120, a plurality of planetary gears 140 disposed to mesh with the sun gear 130 and the ring gear 120 on the inside of the ring gear 120, a carrier 150 on which the plurality of planetary gears 140 are rotatably supported, and a clutch spring 160 that selectively tightening or loosening an outer circumferential surface of the shaft support portion 81 according to a rotation direction when the worm wheel 110 and the sun gear 130 are rotated relative to each other while being slidably wound around the outer circumferential surface of the shaft support portion 81.

The worm wheel 110 has a cylindrical shape, and is provided with helical gear teeth 111 meshing with the helical gear teeth 61*b* of the worm member 61 on the outer circumferential thereof.

The worm wheel 110 includes a circular body 112, which is made of steel, and a ring body 113, which is made of plastic, coupled to an outer circumferential of the circular body 112.

The circular body 112 and the ring body 113 may be manufactured by an insert injection, and the helical gear teeth 111 is provided on an outer circumferential of the ring body 113.

A concave receiving groove 114 is formed on an upper surface of the circular body 112, and a locking rib 115 extending from a side wall 114*a* of the receiving groove 114 is provided inside the receiving groove 114.

A plurality of locking ribs 115 may be provided at equal intervals along a circumferential direction of the receiving groove 114. The locking ribs 115 of the embodiment of the disclosure show an example in which three are arranged at equal intervals, but is not limited thereto.

Each of the locking ribs 115 includes a first portion 115*a* extending from the side wall 114*a* of the receiving groove 114 toward a center of the receiving groove 114, and a second portion 115*b* extending in a longitudinal direction from an end of the first portion 115*a*.

The sun gear 130 includes a body 131, a support rib 132, and a gear portion 133.

The body 131 of the sun gear 130 is inserted into a hole 116 passing through a center of a bottom 114*b* of the receiving groove 114, the support rib 132 extends outward from an upper end of the body 131 to be slidably supported on the bottom 114b of the receiving groove 114, and the gear portion 133 extends downward from a lower end of the body 131 to be located inside the ring gear 120.

A plurality of support ribs 132 may be provided at equal intervals along a circumferential direction of the body 131. The number of the support ribs 132 of the embodiment of the disclosure shows an example in which three are arranged, but is not limited thereto.

The support ribs 132 may be positioned between each of the plurality of locking ribs 115 provided in the receiving grooves 114. When the sun gear 130 rotates relative to the worm wheel 110, the support ribs 132 may come into contact with the locking ribs 115 after being rotated by a predetermined angle.

The clutch spring 160 is provided in a state of being slidably wound around the outer circumferential surface of the shaft support portion 81 extending from the cover 80, and when the worm wheel 110 and the sun gear 130 are rotated relative to each other, the clutch spring comes into contact with at least one of the support ribs 132 and the locking ribs 115 according to the rotation direction.

The clutch spring 160 includes a body 161 in a spiral shape that surrounds an outer surface of the shaft support portion 81 a plurality of times, and first and second ends 162 and 163 protruding outward from both upper and lower ends of the body 161.

When the clutch spring 160 is installed on the outer surface of the shaft support portion 81, the first end 162 protruding from the lower end of the body 161 of the clutch spring 160 is positioned between the support rib 132 and the first portion 115a of the locking rib 115, and the second end 163 protruding from the upper end of the body 161 of the clutch spring 160 is positioned between the second portions 115b of the two locking ribs 115 adjacent to each other at the upper end of the support rib 132.

Accordingly, when the sun gear 130 is rotated relative to the worm wheel 110, the first end 162 of the clutch spring 160 may contact the support rib 132 and the first portion 115a of the locking rib 115, and the second end 163 may contact the second portion 115b of the locking rib 115.

As a result, when the worm wheel 110 rotates in one direction (e.g., counterclockwise), the first portion 115a of the locking rib 115 comes into contact with the first end 162 to rotate together with the first end 162. At this time, the body 161 of the clutch spring 160 does not tighten the outer circumferential surface of the shaft support portion 81, thereby causing a slip from the shaft support portion 81. Thereafter, as the first end 162 comes into contact with the support rib 132, the sun gear 130 rotates together with the worm wheel 110. In this state, when the sun gear 130 rotates in the other direction (e.g., clockwise) opposite to one direction, the first end 162 rotates in a direction in which the body 161 of the clutch spring 160 tightens the outer circumferential surface of the shaft support portion 81, so that the rotation of the sun gear 130 is restricted.

Conversely, when the worm wheel 110 rotates in the other direction (e.g., clockwise), the second end 163 of the clutch spring 160 comes into contact with the second portion 115b of the locking rib 115 to rotate together. At this time, the body 161 of the clutch spring 160 does not tighten the outer circumferential surface of the shaft support portion 81, thereby causing a slip from the shaft support portion 81. Thereafter, as the first portion 115a of the locking rib 115 comes into contact with the support rib 132, the sun gear 130 rotates together with the worm wheel 110.

The plurality of planetary gears 140 are rotatably installed on shaft portions 151 formed on the carrier 150, respectively. For example, three planetary gears 140 are arranged at equal intervals along the circumferential direction of the sun gear 130.

The carrier 150 is formed in the form of a disk, and the output shaft 42 is provided on the opposite surface where the planetary gear 140 is installed. Because the output shaft 42 is connected with the shaft portion 32b of the rotating ramp 32 that belongs to the aforementioned BIR mechanism 30, the output shaft 42 transmits output of the reduction gear unit 100 to the output conversion device 20.

The ring gear 120 may have a hollow cylindrical shape with an open bottom, and may be coupled to the inside of the gear accommodating portion 72 to limit rotation.

A plurality of binding grooves 74 spaced apart from each other at a predetermined intervals are provided around a side wall 73 of the gear accommodating portion 72, and a plurality of binding ribs 121 spaced apart from each other at a predetermined intervals along an outer circumferential of the ring gear 120 enters from an upper portion of the binding grooves 74 and is fitted. Accordingly, the ring gear 120 is coupled in a state in which rotation thereof is restricted in the gear accommodating portion 72.

Hereinafter, an operation of the actuator during braking and releasing the brake of the brake device according to an embodiment of the disclosure will be described.

Figure 8:
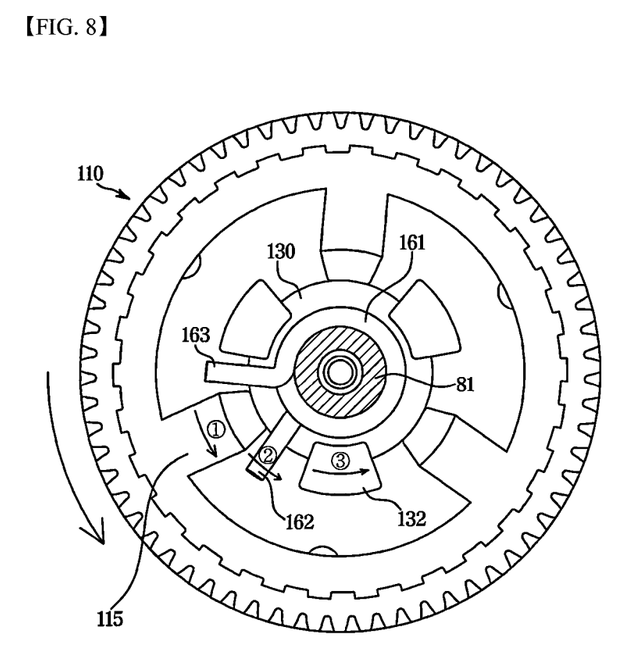
FIG. 8 is a view illustrating an operation state of the reduction gear unit during braking according to an embodiment of the disclosure.
Figure 9:
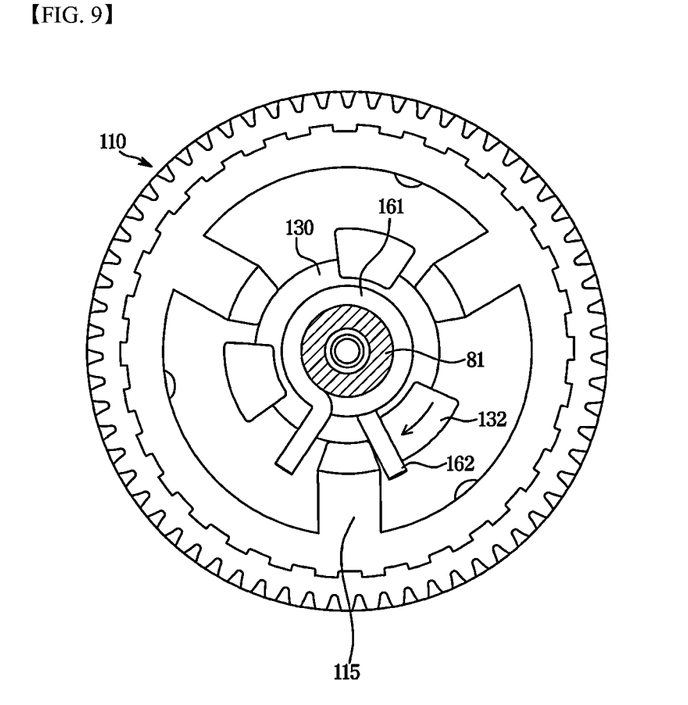
FIG. 9 is a view illustrating an operation state of the reduction gear unit according to transmission of a reverse rotation torque after braking according to an embodiment of the disclosure.
Figure 10:
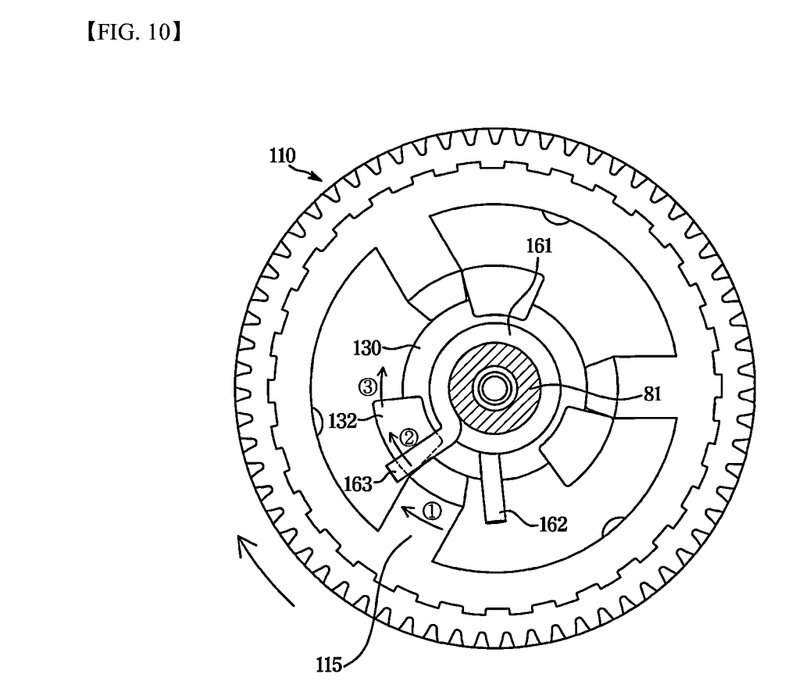
FIG. 10 is a view illustrating an operation state of the reduction gear unit when braking is released according to an embodiment of the disclosure.

FIG. 8 is a view illustrating an operation state of the reduction gear unit during braking according to an embodiment of the disclosure, FIG. 9 is a view illustrating an operation state of the reduction gear unit according to transmission of a reverse rotation torque after braking according to an embodiment of the disclosure, and FIG. 10 is a view illustrating an operation state of the reduction gear unit when braking is released according to an embodiment of the disclosure.

Referring to FIGS. 1 and 8, when the motor 50 is driven during braking, power of the motor 50 is transmitted to the worm wheel 110 through the driving worm 51, the driven worm wheel 61c, and the helical gear teeth 61b of the worm member 61, and the worm wheel 110 receiving the power of the worm member 61 rotates counterclockwise.

As the worm wheel 110 rotates counterclockwise, the locking ribs 115 of the worm wheel 110 comes into contact with the first end 162 of the clutch spring 160 to rotate the first end 162 counterclockwise. In this case, because the body 161 of the clutch spring 160 does not tighten the outer circumferential surface of the shaft support portion 81, the first end 162 of the clutch spring 160 rotates together with the worm wheel 110 and then contacts the support rib 132 of the sun gear 130, so that the sun gear 130 is rotated counterclockwise.

Accordingly, the rotational force of the worm wheel 110 is transmitted to the plurality of planetary gears 140 through the sun gear 130, and the plurality of planetary gears 140 revolves around the sun gear 130 along the gear teeth 122 of the ring gear 120, so that the carrier 150 is rotated. The rotation of the carrier 150 rotates the rotating lamp 32 of the output conversion device 20 through the output shaft 42.

As the rotating lamp 32 of the output conversion device 20 rotates, the balls 33 roll between the inclined guide grooves 31b and 32c. As a result, the rotating lamp 32 rotates and moves the push member 21 forward in the axial direction to press the piston 12, thereby performing braking.

Referring to FIG. 9, when the power of the motor 50 is released after braking, a reverse rotation torque transmitted through the output shaft 42 by reaction force of the output conversion device 20 rotates the sun gear 130 clockwise.

When the sun gear 130 rotates clockwise, the support ribs 132 of the sun gear 130 comes into contact with the first end 162 of the clutch spring 160 to rotate the first end 162 in the clockwise direction. Furthermore, as the body 161 of the clutch spring 160 tightens the outer surface of the shaft support portion 81, the rotation of the sun gear 130 is restricted by frictional force to prevent loosening of the reduction gear unit 100.

Referring to FIG. 10, when the motor 50 is driven when braking is released, the power of the motor 50 is transmitted to the worm wheel 110 through the driving worm 51, the driven worm wheel 61c, and the worm member 61 and the worm wheel 110 receiving the power of the worm member 61 rotates clockwise.

As the worm wheel 110 rotates clockwise, the locking ribs 115 of the worm wheel 110 comes into contact with the second end 163 of the clutch spring 160 to rotate the second end 163 in the clockwise direction. In this case, because the body 161 of the clutch spring 160 does not tighten the outer circumferential surface of the shaft support portion 81, it rotates together with the worm wheel 110. Thereafter, the locking ribs 115 of the wheel 110 comes into contact with the support ribs 132 of the sun gear 130 and rotates the sun gear 130 in the clockwise direction, thereby releasing a rotation torque transmitted to the output conversion device 20.

As described above, although a few embodiments of the disclosure have been shown and described, it would be appreciated by those skilled in the art that changes may be made in these embodiments without departing from the principles and spirit of the disclosure, the scope of which is defined in the claims and their equivalents.

The invention claimed is:

1. An actuator for a brake device, comprising:
   a housing accommodating a motor, a power transmission unit connected to the motor, and a reduction gear unit connected to the power transmission unit; and
   a cover covering an open top of the housing and having a shaft support portion;
   wherein the reduction gear unit comprises:
   a worm wheel rotating by receiving power from the power transmission unit, the worm wheel including a concave receiving groove on an upper surface thereof and a locking rib provided in the receiving groove,
   a sun gear supported rotatably on a bottom of the receiving groove and having a support rib contactable with the locking rib during rotation, and
   a clutch spring provided in a state of being slidably wound around an outer circumferential surface of the shaft support portion and configured to tighten or loosen selectively an outer circumferential surface of the shaft support portion by coming into contact with at least one of the support rib and the locking rib according to a rotation direction when the worm wheel and the sun gear are rotated relative to each other.

2. The actuator of claim 1, wherein the clutch spring includes a body surrounding the outer circumferential surface of the shaft support portion a plurality of times, a first end protruding from a lower end of the body to be positioned between the support rib and the locking rib and capable of contacting the support rib and the locking rib during rotation, and a second end protruding from an upper end of the body and capable of contacting the locking rib during rotation.

3. The actuator of claim 2, wherein the first end is, when the worm wheel rotates counterclockwise, configured to rotate counterclockwise while in contact with the support rib and the locking rib so that the body is slidable with respect to the outer surface of the shaft support portion.

4. The actuator of claim 2, wherein the second end is, when the worm wheel rotates clockwise, configured to rotate clockwise while in contact with the locking rib so that the body is slidable with respect to the outer surface of the shaft support portion.

5. The actuator of claim 3, wherein the first end is, when the sun gear rotates clockwise, configured to rotate clockwise by the support rib so that the body tightens the outer surface of the shaft support portion.

6. The actuator of claim 1, wherein a plurality of the support ribs and the locking ribs are alternately positioned along a circumferential direction in the receiving groove to be in contact with each other during rotation.

7. The actuator of claim 2, wherein the locking rib includes a first portion extending from a side wall of the receiving groove toward a center of the receiving groove and contacting at least one of the support rib and the first end during rotating, and a second portion extending in a longitudinal direction from the first portion and contacting the second end during rotation.

8. The actuator of claim 1, wherein the reduction gear unit comprises:
   a plurality of planetary gears meshed with the sun gear,
   a ring gear as an internal gear to accommodate the plurality of planetary gears, and
   a carrier rotatably supporting the plurality of planetary gears and having a rotation shaft supported by the shaft support portion so as to rotate coaxially with the sun gear.

9. The actuator of claim 1, wherein the worm wheel includes a circular body in which the receiving groove is formed, and a ring body coupled to an outer circumferential of the circular body and having a gear portion.

10. The actuator of claim 9, wherein the circular body includes a steel material, and the ring body includes a plastic material.

11. The actuator of claim 10, wherein the circular body and the ring body are manufactured by an insert injection.

12. The actuator of claim 1, wherein the power transmission unit includes a worm member, the worm member including a shaft portion having helical gear teeth and a driven worm wheel provided at an end of the shaft portion so as to mesh with the driving worm coupled to a rotation shaft of the motor.

13. A brake device, comprising:
   a piston slidably provided in a cylinder of a caliper housing to press a pad plate;
   an actuator including a housing accommodating a motor, a power transmission unit connected to the motor, and a reduction gear unit connected to the power transmission unit, and a cover covering an open top of the housing and having a shaft support portion; and
   an output conversion device that receives a rotational motion from the actuator and converts the rotational motion into a linear motion to apply a thrust to move the piston;
   wherein the reduction gear unit comprises:
   a worm wheel rotating by receiving power from the power transmission unit, the worm wheel including a concave receiving groove on an upper surface thereof and a locking rib provided in the receiving groove, a sun gear supported rotatably on a bottom of the receiving groove and having a support rib contactable with the locking rib during rotation, and a clutch spring provided in a state of being slidably wound around an outer circumferential surface of the shaft support portion and configured to tighten or loosen selectively an outer circumferential surface of the shaft support portion by coming into contact with at least one of the support rib and the locking rib according to a rotation direction when the worm wheel and the sun gear are rotated relative to each other.

14. The brake device of claim 13, wherein the clutch spring includes a body surrounding the outer circumferential surface of the shaft support portion a plurality of times, a first end protruding from a lower end of the body to be positioned between the support rib and the locking rib and capable of contacting the support rib and the locking rib during rotation, and a second end protruding from an upper end of the body and capable of contacting the locking rib during rotation.

15. The brake device of claim 14, wherein
when the sun gear rotates by reaction force of the output conversion device after braking, the body tightens the outer circumferential surface of the shaft support portion as the support rib presses and rotates the first end.

\* \* \* \* \*